United States Patent

Wagner

[15] 3,687,184
[45] Aug. 29, 1972

[54] FASTENER UNIT
[72] Inventor: David P. Wagner, Elmhurst, Ill.
[73] Assignee: Illinois Tool Works Inc., Chicago, Ill.
[22] Filed: Dec. 30, 1969
[21] Appl. No.: 889,154

[52] U.S. Cl. .................................. 151/37, 85/50
[51] Int. Cl. .................................. F16b 39/26
[58] Field of Search .............. 85/50, 1 JP; 151/37

[56] References Cited

UNITED STATES PATENTS

| | | | |
|---|---|---|---|
| 2,236,235 | 3/1941 | Head | 151/37 |
| 2,277,885 | 3/1942 | Rodamet | 85/1 JP |
| 2,560,092 | 7/1951 | DeLaMater | 85/1 JP |
| 2,639,832 | 5/1953 | Bergstrom | 85/1 JP |
| 2,702,063 | 2/1955 | Poupitch | 151/37 |
| 2,765,834 | 10/1956 | Poupitch | 151/37 |
| 2,771,262 | 11/1956 | Laystrom | 85/50 |
| 2,795,444 | 6/1957 | Nenzell | 85/1 JP |
| 3,181,584 | 5/1965 | Borowsky | 151/37 |
| 3,299,766 | 1/1967 | Goord et al. | 85/50 |

FOREIGN PATENTS OR APPLICATIONS

| | | | |
|---|---|---|---|
| 1,109,551 | 9/1955 | France | 85/1 JP |
| 6,708,633 | 12/1968 | Netherlands | 85/1 JP |

Primary Examiner—Marion Parsons, Jr.
Attorney—Olson, Trexler, Wolters & Bushnell, Robert W. Beart, Michael Kovac, Barry L. Clark and Jack R. Halvorsen

[57] ABSTRACT

The present invention relates generally to fastener units of the type comprising pre-assembled screw and washer members, and more particularly to fastener units in which the washer element is free from direct contact with the screw member. The fastener unit disclosed herein comprises a screw member having a threaded shank extending from the clamping side of a screw head and a generally tubular washer retainer member encircling and peripherally impinging the screw shank in the vicinity of the clamping surface of the screw head. An apertured washer member encircles the tubular member provides shoulder means beneath the washer to prevent unauthorized separation of the washer and screw member.

7 Claims, 5 Drawing Figures

PATENTED AUG 29 1972 3,687,184
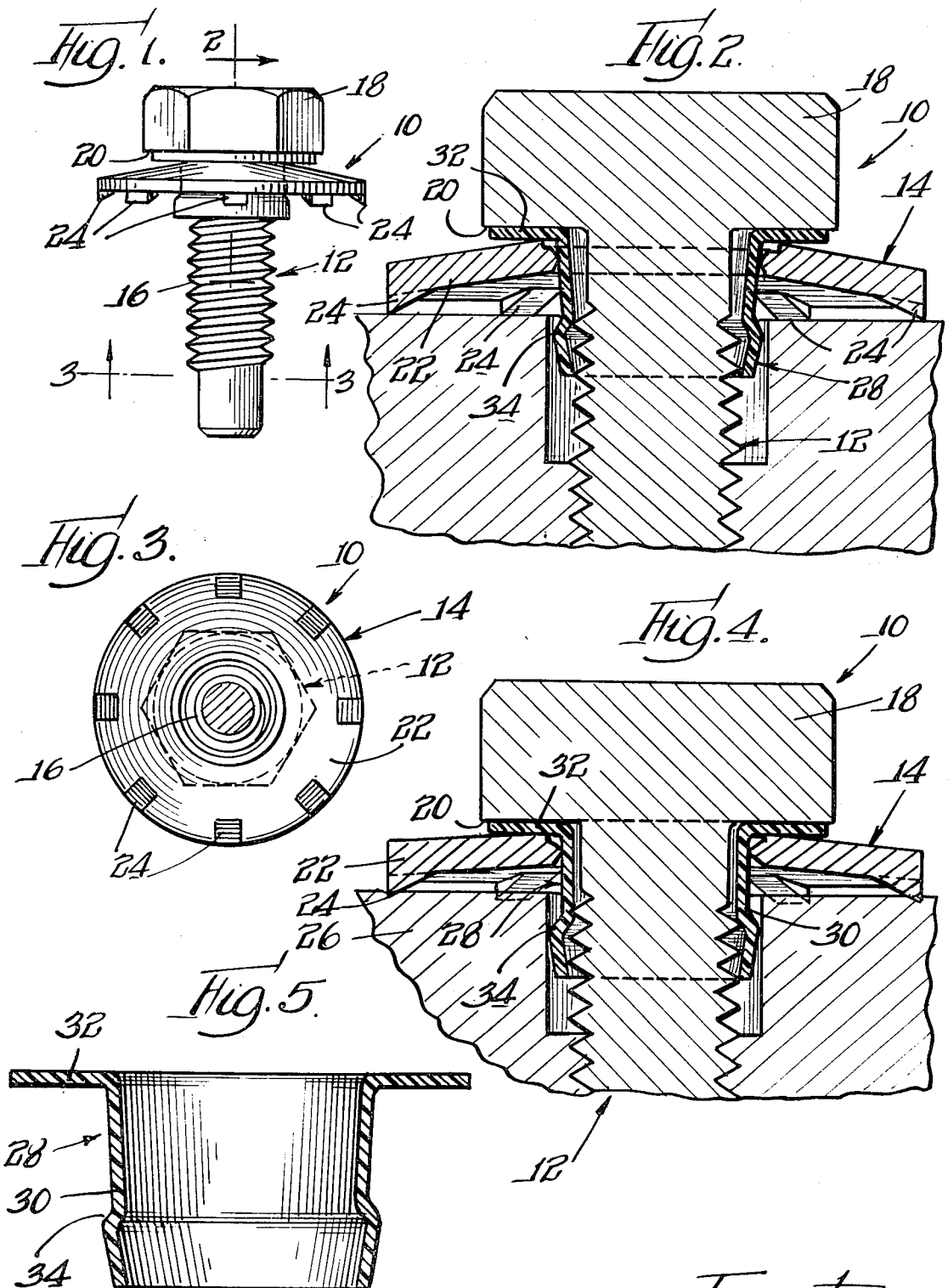
Inventor
David P. Wagner
By: Olson, Trexler, Wolters & Bushnell attys

FASTENER UNIT

The present invention is concerned primarily with the association of novel washer retainer means with a fastener unit comprising a washer telescopically associated with a screw shank.

More specifically, the present invention contemplates the provision of an improved fastener unit construction wherein a washer may be secured against axial displacement with respect to a screw shank by auxiliary retainer means of novel and inexpensive design.

It is a further object of the present invention to provide a fastener unit of the type referred to above wherein improved washer retaining means is provided which will electrically insulate the washer from an associated screw member.

More specifically, the present invention contemplates an improved pre-assembled washer and screw device wherein the washer is so constructed that it will yield axially when clamped against a work surface, thereby increasing the impingement of the inner margin of the washer against the peripheral surface of a washer retainer member.

The foregoing and other objects and advantages will be more apparent from the following detailed description when considered in connection with the accompanying drawing wherein:

FIG. 1 is a side elevational view of a fastener unit of the type contemplated hereby;

FIG. 2 is an enlarged fragmentary central sectional view taken substantially along the line 2—2 of FIG. 1;

FIG. 3 is a plan view of the device shown in FIG. 1;

FIG. 4 is an enlarged vertical sectional view similar to FIG. 2 disclosing the washer element finally tightened against the work surface; and FIG. 5 is an enlarged fragmentary sectional view of the electrically non-conductive washer retainer member.

Referring now to the drawing more in detail, wherein like numerals have been employed designates similar parts throughout the various figures, it will be seen that one embodiment of the invention comprises a fastener unit designated generally by the numeral 10. The fastener unit 10 includes a screw member 12 and a washer member 14. The screw member 12 is provided with a threaded shank 16 extending from and formed integral with a head 18. The underside of the head 18 provides a clamping surface 20 and in the disclosed embodiment, the washer 14 has an annular body portion 22 of substantially conical form. The outer margin of the washer 14 is provided with suitable teeth 24 adapted for aggressive impingement with the surface of a workpiece 26 as shown in FIG. 4.

Attention is now directed to a generally tubular washer retainer member designated generally by the numeral 28. The retainer member 28 is preferably formed of electrically non-conductive material and includes a sleeve portion 30 terminating at its upper extremity in a radial flange 32. Axially spaced from the flange 32 is an annular shoulder 34 which defines an outer periphery having a diameter which is sufficiently larger than the internal diameter of the washer 14 so as to prevent the washer from being unintentionally separated from the screw member 12. Before the washer 14 is tightened against the work surface as shown in FIG. 4, the diameter of the inner periphery of the sleeve 30 in the vicinity of the flange 32 is preferably slightly larger than the maximum external diameter of the screw shank. This is clearly illustrated in FIG. 2.

In assembling the parts, the retainer member 28 is first telescopically associated with the washer 14, and this assembly is then telescopically associated with the threaded shank 16 of the screw member 12. The inner diameter of the sleeve adjacent the free extremity thereof is normally slightly smaller than the maximum outer diameter of the screw shank. Hence the sleeve 30 must be forced over the threads of the shank and it is this impingement of the sleeve 30 with the outer periphery of the screw shank which prevents unauthorized or unintentional axial displacement of the sleeve with respect to the threaded shank. The shoulder 34 of the retainer member 28 cooperates to prevent dislodgement of the washer 14.

In practice, the workpiece will generally comprise two layers 26 and 26'. One of these layers 26 or 26' being of non-conductive material. In this environment, the washer retainer 28 will effectively electrically insulate the washer 14 from the screw member 12. The desired insulation also will result if a nonconductive insulating sheet (not shown) were placed between workpiece 26 and 26'.

As the screw is tightened in the workpiece 26 and the washer 14 is subjected to axial clamping forces, said washer will have a tendency to flatten and thereby cause reduction in the normal diameter of the washer aperture resulting in aggressive impingement of the washer margin with the outer periphery of the sleeve 30 as shown in FIG. 4. The inner margin of the washer is preferably reduced in the thickness to enhance the aggressiveness with which said margin will engage, and in fact, imbed itself within the retainer periphery.

From the foregoing it will be apparent that the present invention contemplates a very simple, yet practical three piece fastener unit comprising a screw member, a washer member and an electrically non-conductive or sealing type washer retainer member. Fastener units have heretofore been available which depend upon an extruded thread convolution for securing a washer against dislodgement. Such fastener units require that the washer be first telescopically associated with a screw blank and the thread convolutions thereafter rolled upon the bank. The present invention makes it possible for a washer to be telescopically associated with a screw member upon which the threads have previously been rolled. The simple plastic retainer is very inexpensive to produce and greatly facilitates the ease with which the three parts may be brought together as an assembled unit.

I claim:

1. A fastener unit including a screw member having a threaded shank, a head at one extremity thereof having a clamping surface from which the shank extends, a generally tubular washer retainer member encircling said shank portion in the vicinity of said head, said retainer member being made of a dielectric material and having an integral radial flange of substantial radial extent positioned adjacent to and traversing said clamping surface, an apertured dished washer member telescopically associated with said tubular retainer member oriented with its convex surface adjacent the flange of the retainer member and positioned adjacent to the underside of said flange means, and externally projecting shoulder means formed in the tubular member at a position spaced axially from said flange means, the outer periphery defined by said shoulder means being greater in diameter than said washer aperture whereby to prevent unauthorized axial separation of the washer and said retainer member, said washer retainer member at a position spaced axially from said flange means formed inwardly to present a diameter measurement less than the crest diameter of the threads of said screw member, said inwardly formed portions being laterally yieldable to permit telescopic association with said screw member, said tubular retainer member after being mounted on said screw member being laterally yieldable to permit telescopic association of the apertured washer whereby to provide an electrically insulated washer relative to the screw member with which it is associated.

2. A fastener unit as set forth in claim 1, wherein the shoulder means comprises a radially outwardly deflected annular portion of said tubular retainer member.

3. A fastener unit as set forth in claim 1, wherein the tubular retainer member has an internal diameter which progressively decreases toward the entering extremity of the screw member associated therewith.

4. A fastener unit as set forth in claim 1, wherein the screw member has an unthreaded shank portion adjacent the clamping surface of the head.

5. A fastener unit as set forth in claim 1, wherein the inner margin of the washer member defining the washer aperture is of substantially reduced axial thickness.

6. A fastener unit as set forth in claim 1, wherein the inner margin of the washer member defining the washer aperture progressively diminishes radially inwardly to provide a marginal edge for engaging the outer periphery of the tubular retainer member.

7. A fastener unit as set forth in claim 1, wherein the outer margin of said washer member being provided with teeth for aggressively impinging said work surface.

* * * * *

UNITED STATES PATENT OFFICE
CERTIFICATE OF CORRECTION

Patent No. 3,687,184　　　　　　　　　　Dated August 29, 1972

Inventor(s) David P. Wagner

It is certified that error appears in the above-identified patent and that said Letters Patent are hereby corrected as shown below:

In the abstract, line 12, after "member" insert -- on the underside of integral flange and tubular member--

Col. 2, line 50, change "bank" to --blank--

Signed and sealed this 24th day of April 1973.

(SEAL)
Attest:

EDWARD M. FLETCHER, JR.　　　　　　　　ROBERT GOTTSCHALK
Attesting Officer　　　　　　　　　　　　Commissioner of Patents